United States Patent [19]
Tuomaala et al.

[11] 3,945,615
[45] Mar. 23, 1976

[54] CONTINUOUS METHOD AND DEVICE FOR WITHDRAWING PARTICULATE MATERIAL FROM A CONTAINER

[75] Inventors: Jorma Aarne Kullervo Tuomaala, Karhula; Bertel Myréen, Turku, both of Finland

[73] Assignee: A. Ahlstrom Osakeyhtio, Finland

[22] Filed: Oct. 15, 1973

[21] Appl. No.: 406,580

[30] Foreign Application Priority Data
Oct. 19, 1972 Finland ............................ 2900/72

[52] U.S. Cl. ............ 259/6; 99/646 S; 259/DIG. 17
[51] Int. Cl.² ........................................... B01F 7/08
[58] Field of Search ............ 259/4, 5, 6, 7, 8, 9, 10, 259/97, 40, 41, 42, 43, 44, 45, 46, 150, 180, 47, DIG. 17; 99/646 S

[56] References Cited
UNITED STATES PATENTS

| | | | |
|---|---|---|---|
| 1,720,112 | 7/1929 | Allen | 259/180 |
| 2,292,897 | 8/1942 | Nielsen | 259/DIG. 17 |
| 2,401,913 | 6/1946 | Dawson | 259/47 |
| 3,166,300 | 1/1965 | Richter | 259/4 |
| 3,563,399 | 2/1971 | Shivers | 259/97 |
| 3,570,817 | 3/1971 | Claussen | 259/4 |

*Primary Examiner*—Robert W. Jenkins
*Attorney, Agent, or Firm*—Bucknam and Archer

[57] ABSTRACT

A method and device for the continuous mixing and removal of pulverous or fragmentary material from a container, such as a silo or the like, so that the various layers of material simultaneously become mixed with each other, in which case material is removed at a level below the feeding level, essentially over the entire silo width, the material being removed so that its sinking rate in the silo increases towards the line between the feeding and the removal points in order to slant the material layers towards the said line so that the material can be removed in a controlled manner from the slanted layers by means of a removal member or members directed across the layers.

9 Claims, 9 Drawing Figures

CONTINUOUS METHOD AND DEVICE FOR WITHDRAWING PARTICULATE MATERIAL FROM A CONTAINER

BACKGROUND OF THE INVENTION

1. Field of the Invention

The present invention relates to a method and device for the continuous mixing and removal of pulverous or fragmentary material from a container, such as a silo or the like.

2. Description of the Prior Art

Mixing different pulverous or fragmentary components before a mechanical, thermal, or chemical treatment is necessary in very many industries, such as the cement and metallurgical industries. In the cement industry in particular there is a great need to mix the powder which is ground in raw-powder mills and which has a chemical composition which varies more or less during the process, into a mixture homogeneous in regard to its chemical composition before the material is fed into the cement furnaces. In the said industry it is also necessary to mix great amounts of clinker or cement prepared at different times in order to lessen the quality fluctuations of the final product.

The known methods for mixing pulverous or fragmentary materials in order to even out the quality can be classified into batch methods and continuous methods.

In continuous methods, an amount of material approximately equal to the amount fed into the silo is continuously removed from the silo. In one known method, pulverous material is continuously kept in a suspended state by means of air blowing, while powder is fed and removed continuously. However, this method requires a considerable air compressor efficiency.

In another known method, in which the mixing efficiency is, however, very low, air is blown through openings at the bottom of the silo so that powder continuously flows out of the silo while powder is fed into the upper part of the silo. Even if the air blowing mechanisms cover most of the silo bottom, the removal of powder takes place through narrow channels directly above the outlet opening, in which case the fed material is carried through these channels directly to the outlet opening without becoming mixed with the bulk of the material in the silo. A certain mixing effect is obtained in these silos if the powder is fed periodically while the removal is taking place continuously. In this case depressions are created on the surface of the material above the outlets, and the upper layers in the silo become mixed with each other when the powder collapses into these depressions. Becuase powder has a relatively low collapsing angle once it has been made to move, the collapsing causes mixing only in a relatively thin layer in the silo.

A better mixing effect is obtained if the homogenization silo has been divided into two layers one on top of the other, in which case the upper one is filled continuously while the lower one is being emptied. When the upper compartment has become filled to a certain degree, the several openings at the bottom of this compartment open and its contents rapidly flow into the lower compartment. In this way a more effective mixing by collapse is effected in the upper compartment while the pulverous material forms a suspended surface layer in the lower compartment and thereby becomes mixed.

The object of the present invention is to eliminate the aforementioned drawbacks and to provide a continuous method and device for removing pulverous or fragmentary material from a container, such as a silo or the like, so that the composition of the outlet flow represents approximately the mean of the compositions of the layers of materials of different compositions in the silo in order to minimize the quality fluctuations of the outlet flow per time unit, and this device is simple and inexpensive both to use and to acquire.

SUMMARY OF THE INVENTION

According to the results of experiments reported to literature, powder, as well as fragmentary material, sinks almost only vertically downwards in a silo when material is removed from the bottom of the silo. If material is removed in a controlled manner essentially over the entire width of the silo bottom surface, the entire contents of the silo will sink. By designing the removing member so that the outlet rate of the material increases towards the center line of the silo, the material is caused to sink at a higher rate in the middle of the silo than at its circumference. The fed material with a composition which changes as a function of time settles in layers in the silo. Owing to the material sinking rate which changes as a function of the radius of the silo, the various layers settle with time more and more in a vertical position, that is, they slant downwards towards the center of the silo. By using as the removing member an arm which turns around the central axis of the silo, extends away from this axis across the slanted layers, and has outlets, material can be separated simultaneously from several layers with different compositions which are, when removed, mixed with each other into a homogeneous outlet flow the composition of which does not greatly vary even if the composition of the feed flow varies greatly.

DESCRIPTION OF THE PREFERRED EMBODIMENTS

Figure 1:
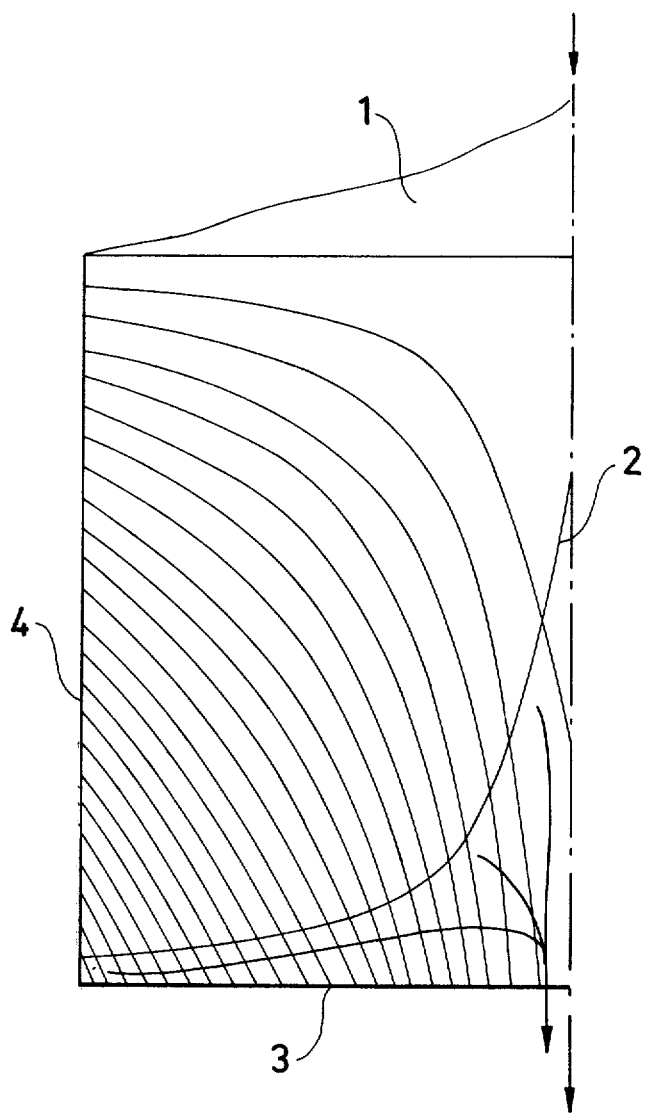
FIG. 1 shows a schematic vertical section of a preferred embodiment of the invention.
Figure 1A:
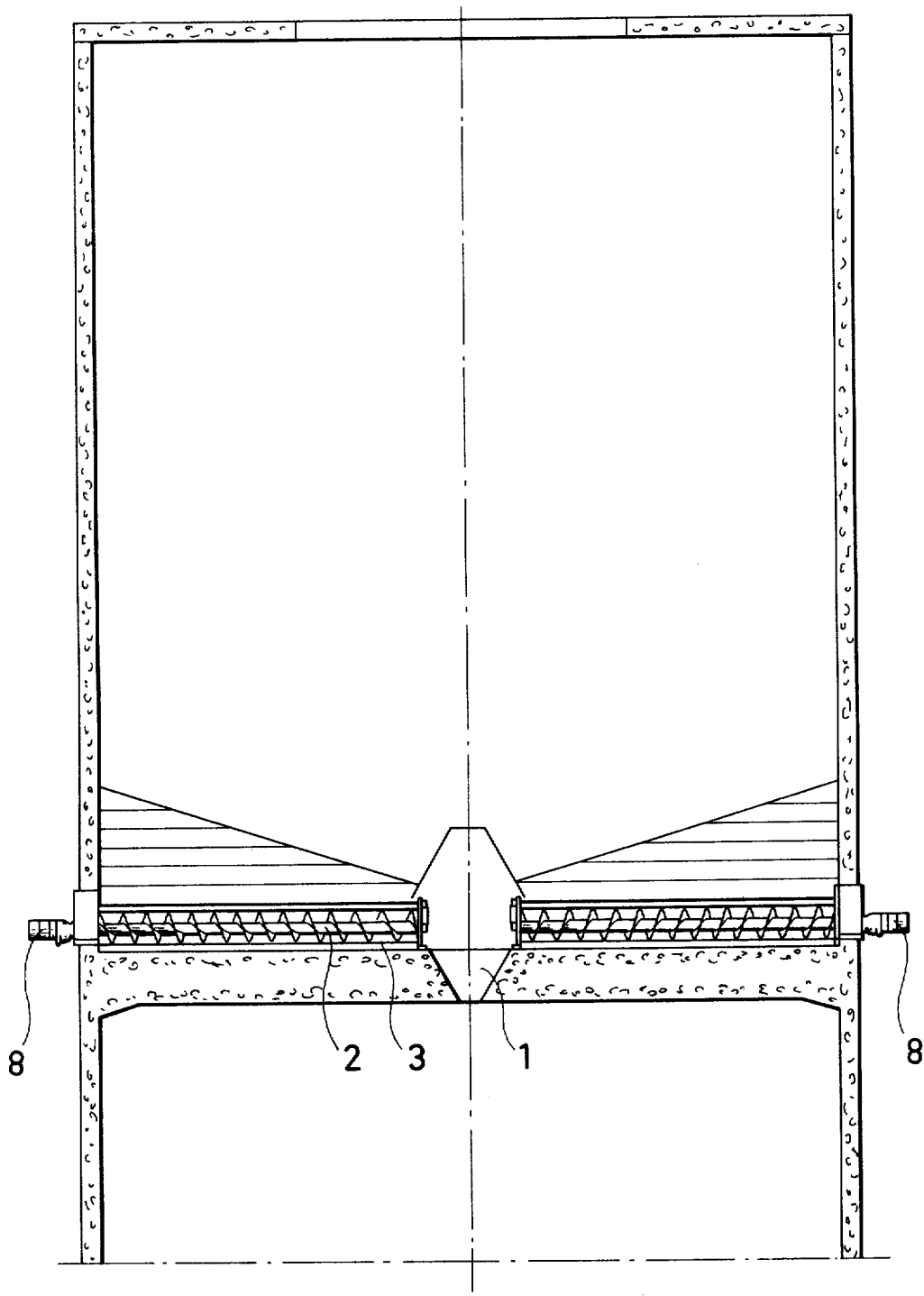
FIG. 1a is a vertical cross section of the apparatus and specifically the silo bottom.
Figure 2:
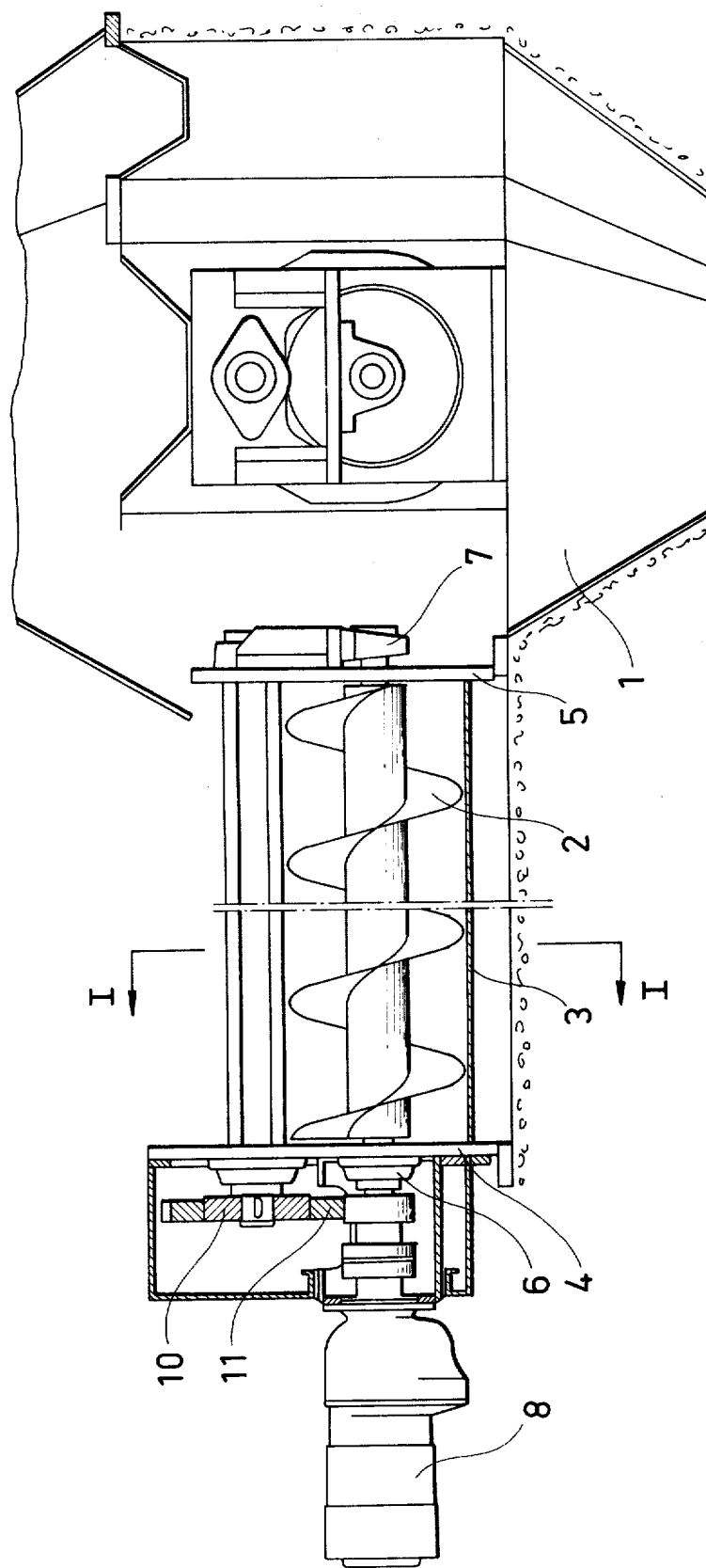
FIG. 2 shows a partial section of a device according to the invention at the bottom part of the silo.
Figure 3:
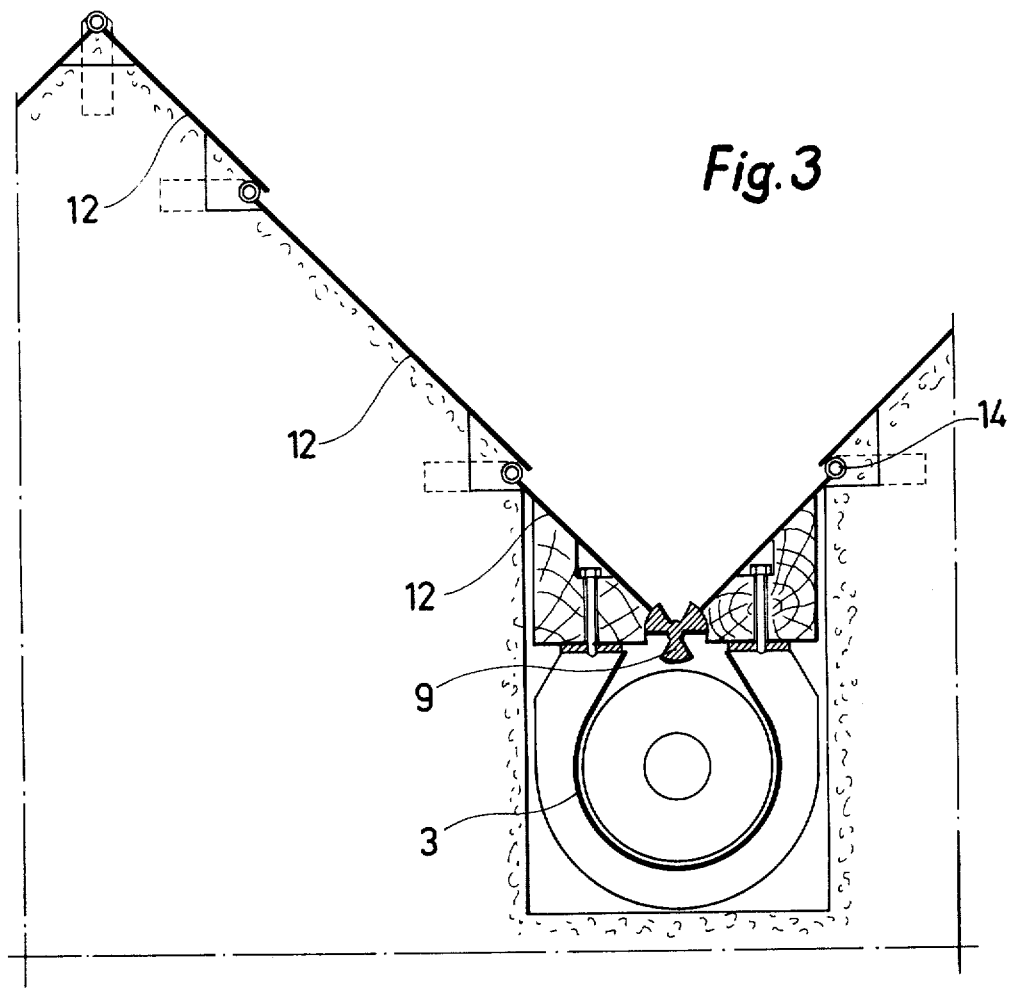
FIG. 3 shows a vertical section along line I—I in FIG. 2.
Figure 4:
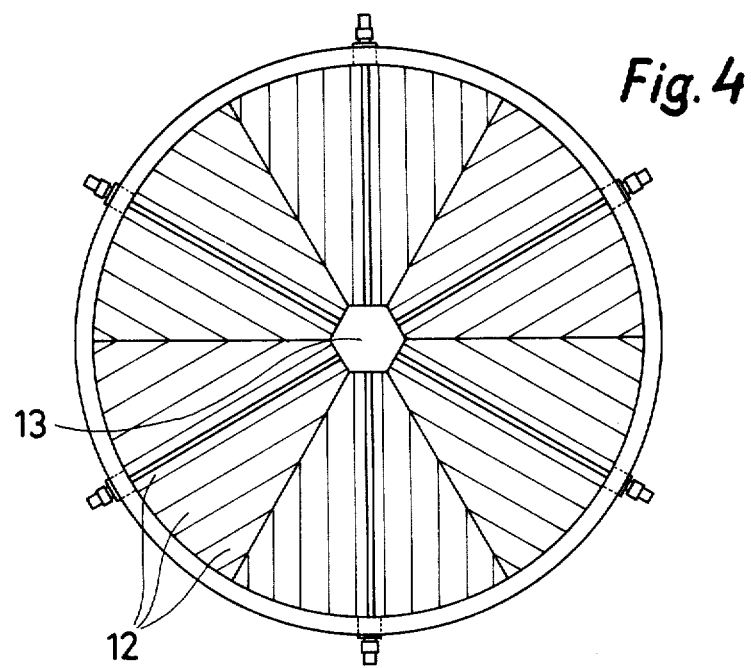
FIG. 4 shows a plan view of the bottom of the container.

FIG. 1 shows how the layers fed into the silo at different times settle in the silo. The layers with different compositions are indicated by lines. The curve indicated by 2 shows how the sinking rate of the powder increases towards the center of the silo. Number 3 refers to the silo bottom and 4 to the silo wall.

FIG. 1 shows that the powders of several different layers are combined during the removal. Because the bottom surface areas of the cut layers increase when the radii increase, while the heights of the layers which are being removed decrease each as a function of its radius, the portions removed from each layer are of an approximately equal size, in which case the composition of the outlet flow is approximately the mean of the compositions of the cut layers. It can be proven that, when the removal takes place horizontally at the bottom of the silo, the most advantageous downward sinking rate w(r) of the material in a vertical silo follows the formula:

$$W = \frac{G}{2\pi p\,(r_y - r_i)} \cdot \frac{1}{r}$$

in which G is the mass flow of the powder through the silo, $p$ the volume weight of the powder, $r_y$ and $r_i$ are the radii between which the removal is achieved, and r is the radius of the silo. When powder is removed from the silo according to this velocity profile, a mixing effect which evens out the quality is also achieved, an effect which is better than if the powder were mixed in a suspended state in the same silo space.

The advantages of the invention are thus: a better mixing efficiency in the same silo space, no upper limit to the mixing silo volume, and a very low power consumption.

As can be seen from FIGS. 1–4, at the lower part of the silo, on the horizontal level, there are radial conveying screws 2 which feed the powder to the funnel 1 in the center of the silo bottom. A conveying screw is surrounded by a groove 3 and the screw supporting bearings 6 and 7 have been secured to the end structures 4 and 5 of the groove. The end 5 is open. The driving motor of the screw is indicated by 8. Above the conveying screw there is a dispensing device 9, which works according to the stop-feed principle. The dispensing device has been coupled to the driving motor through gear pair 10, 11. The dispensing device closes the bottom opening of the V-shaped groove which is parallel to the radius and which consists of gradated adjacent plates 12 and is situated above the conveying screw. The silo bottom consists of adjacent V-grooves which, close to the center line of the silo, join with the pyramidal center part 13. The gradation of the plates has been arranged so that it has been possible to place a perforated air blowing pipe 14 between the plates. Compressed air, which fluidizes the material layer in the vicinity of the groove and thereby promotes the conveying of the material towards the dispensing device at the bottom of the V-groove, is fed into the pipe 14.

When material is removed from the silo during the rotation of the dispensing device, new material flows in from above to replace it.

Since the amount of material removed by the dispensing device is constant per length unit of the device, the vertical flow rate w(r) of the material in the silo will follow the formula given above.

The conveying screw below the dispensing device feeds the material into a funnel 1 on the center line of the silo, from where it can be carried away by means of, for example, a belt conveyor.

Figure 5:
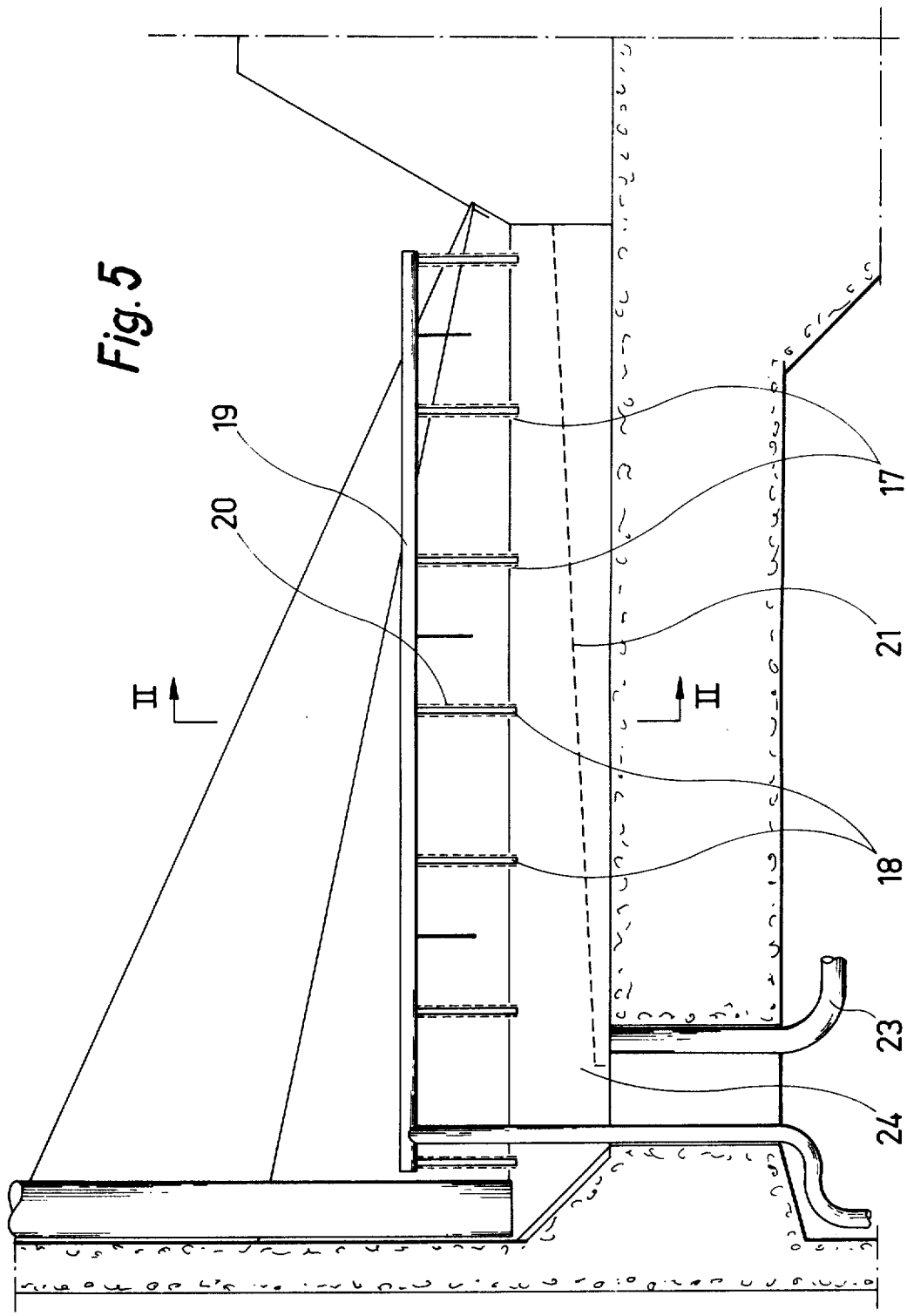
FIG. 5 is a vertical partial section of one alternative embodiment.
Figure 6:
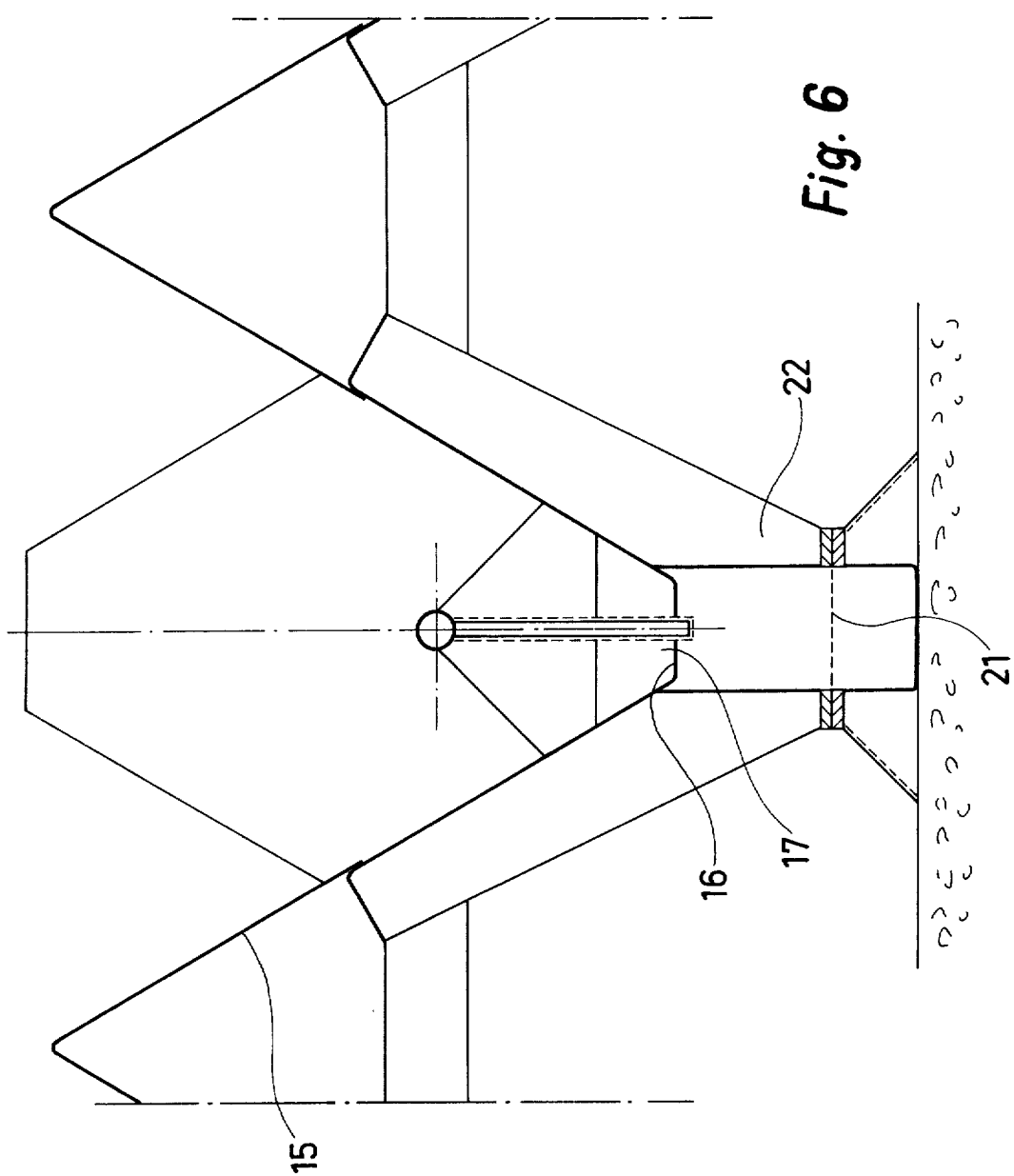
FIG. 6 is a section along line II—II in FIG. 5.

An alternative embodiment is illustrated in FIGS. 5 and 6.

In this embodiment, as in the previous one, the bottom of the silo consists of adjacent, radial, V-shaped grooves. In the horizontal bottom plate 16 of the V-groove there are round openings 17 at regular intervals. At each hole there is an air blowing pipe 18 through the perforated wall of which air is directed to the surrounding space where a fluidized material layer is thereby created. Compressed air is fed into the blowing pipes through divider 19. The blowing pipe has been covered with a porous weave 20, such as a metal wire screen, in order to distribute the air evenly. A groove 22 provided with a perforated floor is situated under the V-groove. Compressed air is fed through the pipe 23, through the perforated bottom plate 22; the conveying of the material in the groove 22 towards the outlet 24 is thereby promoted.

When the material at the bottom of the V-groove is fluidized by means of compressed air, material is removed from it through openings 17. The openings are of an equal size, and an equal amount of material is removed through each opening. An equal amount is removed per each length unit of a radial groove, so that the material flow in the silo follows the principle set forth in the invention. The material which falls in the groove 22 is carried under the effect of the slanted bottom plate and the fed air to the outlet 24, from where it is removed in a manner not described in more detail.

Figure 7:
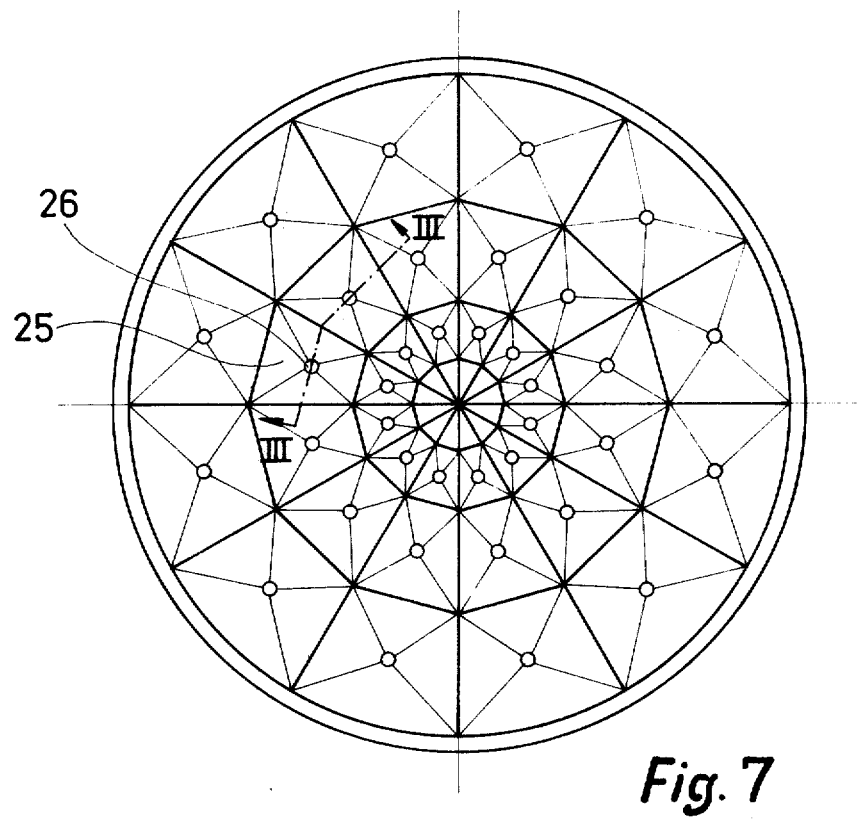
FIG. 7 is a plan view of a third embodiment.
Figure 8:
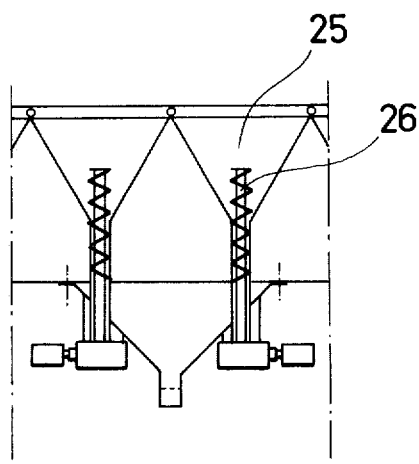
FIG. 8 is a section along line III—III in FIG. 7.

A third embodiment is illustrated in FIGS. 7 and 8.

In this case the silo bottom consists of several adjacent funnels 25, in which vertical screw conveyors 26 for removing material from the silo have been placed. The distribution and feeding capacities of the conveying screws are chosen so that the desired velocity profile is obtained in the silo.

What is claimed is:

1. A continuous method of withdrawing a homogeneous mixture of particulate materials from a container containing the particulate materials in layers, comprising feeding the materials to the container at one point to form horizontal layers of materials therein and withdrawing said materials at another point positioned at a level below the feeding point, essentially over the entire width of the container, causing the descending and withdrawal rates of the materials to increase from the periphery towards the center of said container and withdrawing an amount of material per surface unit which is the smallest at the periphery of the container and which increases towards said center, whereby the layers of the material become at first slanted and then assume a vertical direction towards the bottom center, removing the material from said layers in equal amount from each layer by means of withdrawal means, whereby an homogeneous mixture is formed.

2. The method of claim 1, wherein the material is fed from above into a cylindrical silo at its center and is removed from the silo bottom at its center.

3. The method of claim 1, wherein the sinking rate of the layers in the silo is controlled so that it is inversely proportional to the distance of each layer from the withdrawal point in the container.

4. A device for continuously withdrawing a homogeneous mixture of particulate materials from a container comprising means for feeding a plurality of particulate materials into the container to form horizontal layers of the materials, said means being disposed in the upper part of the container, means for increasing the descending and the withdrawal rate of the material from the periphery towards the center of the container whereby the layers of material become slanted downwardly towards the center of the container, and slanted layers are formed which become more vertical towards the center of the container, a plurality of apertures extending radially across each of said slanted layers and outlet channels under the apertures for receiving and removing material withdrawn from each of said slanted layers through the bottom of the container, said means for increasing the descending and the withdrawal rate comprising a plurality of grooved shafts parallel to said apertures, said grooved shafts operating according to the stop-feed principle and rotating around their longitudinal axis.

5. The device of claim 4, further comprising ridges at the container bottom between the radially extending apertures to divide the material in the container and direct it to the openings.

6. The device of claim 4, in which air blowing means have been fitted above the apertures in order to fluidize the material.

7. The device of claim 4, in which each aperture has an essentially vertical feeding screw for removing at a controlled rate the material from the silo through an opening at the silo bottom.

8. The device of claim 4, in which the outlet channel below it is parallel to the aperture and that it has a feeding screw for feeding towards the outlet opening at the other end of the outlet channel the material separated into the outlet channel.

9. The device of claim 4, in which each aperture comprises a series of radially aligned openings.

* * * * *